US005545715A

United States Patent [19]

Itoh et al.

[11] Patent Number: 5,545,715
[45] Date of Patent: * Aug. 13, 1996

[54] FLAME–RETARDANT RESIN COMPOSITION

[75] Inventors: Hiroyuki Itoh; Masanori Suzuki; Akira Kamiya; Takeki Furuyama, all of Mie, Japan

[73] Assignee: Japan Synthetic Rubber Co. Ltd., Yokkaichi, Japan

[*] Notice: The portion of the term of this patent subsequent to Nov. 2, 2010, has been disclaimed.

[21] Appl. No.: 904,737

[22] Filed: Jun. 26, 1992

[30] Foreign Application Priority Data

Jun. 25, 1991 [JP] Japan .................................. 3-180275

[51] Int. Cl.⁶ .............................. C08J 5/10; C08K 3/10
[52] U.S. Cl. ...................... 564/409; 524/408; 524/410; 524/504; 524/506; 525/63; 525/104
[58] Field of Search ...................... 525/100, 104, 525/63; 524/408, 409, 504, 506

[56] References Cited

U.S. PATENT DOCUMENTS

| 4,263,414 | 4/1981 | West | 525/104 |
|---|---|---|---|
| 4,279,808 | 7/1981 | Hornbaker | 524/409 |
| 4,939,206 | 7/1990 | Wang et al. | 525/63 |
| 4,985,492 | 1/1991 | Wittman et al. | 525/63 |
| 5,147,947 | 9/1992 | Yamamoto et al. | 525/479 |
| 5,258,438 | 11/1993 | Suzuki et al. | 524/209 |

*Primary Examiner*—Ralph H. Dean
*Attorney, Agent, or Firm*—Reed Smith Shaw & McClay

[57] ABSTRACT

The present invention provides a flame-retardant resin composition comprising 100 parts by weight of a bromine-containing copolymer composition containing 1 to 40% by weight of bromine, and comprising 0 to 30 parts by weight of a flame-retarding adjuvant and 0.5 to 30 parts by weight of a polyorganosiloxane-reinforced resin component obtained by polymerizing a vinyl monomer (d) in the presence of a polyorganosiloxane polymer. The flame-retardant resin composition of the present invention has attained a remarkably higher flame retardancy by the inclusion of a polyorganosiloxane-reinforced resin. A significant improvement in the dripping phenomenon has also been achieved. Further, this composition exhibits superior impact resistance and moldability, and a superior outer appearance in the formed products.

23 Claims, No Drawings

FLAME-RETARDANT RESIN COMPOSITION

FIELD OF THE INVENTION

The present invention relates to a flame-retardant resin composition with superior flame-retardancy, which exhibits an improvement in the dripping phenomenon during combustion, and, furthermore, possesses superior resistance to impact, superior moldability, and produces a formed product with a superior external appearance.

BACKGROUND OF THE INVENTION

Conventionally, styrene-containing resins, such as AS resin, polystyrene, high impact polystyrene, and ABS resin, are known to exhibit superior moldability, mechanical strength, and external appearance.

There are cases where flame-retardant characteristics are required in these styrene resins, depending on the service. These characteristics are particularly useful in the case of household products, electrical appliances, OA equipment, and the like, and for automotive products and building materials.

A commonly known method of imparting flame retardancy to styrene-containing resins consists of blending a flame retarder. In many cases, the type of flame retarder used is a brominated diphenyl oxide compound, a brominated polycarbonate compound, or the like. A superior flame-retardant effect is demonstrated when these flame retarders are blended with antimony trioxide.

However, a large amount of flame retarder must be added to impart a high flame retarding effect to the resin, resulting in the problem of bleeding-out of the resin.

In addition, a resin composition comprising a bromine-containing flame retarder exhibits impaired processability. In particular, release of the flame retarder or its decomposition products produces an unpleasant odor, creates noxious compounds, and soils the forming molds.

The addition of an increased amount of flame retarder in order to achieve a high level of flame retardancy induces a problem of producing an increased amount of noxious materials, such as dioxane, furane, and the like during the molding process and during combustion.

As a solution to this type of problem, the addition to the resin material of a compound containing phosphorus and/or nitrogen as a flame retarder in place of the bromine compound has been proposed.

These compounds, however, entail a problem of releasing the flame retarder or its decomposition products and creating noxious compounds, although no particular adverse effect is imparted to the processability of the resin composition.

In addition, the flame retardancy effect from these compounds is extremely low as compared to that from the bromine-containing compounds.

Also, a flame-retardant resin composition to which these compounds have been added does not have adequate flame retardancy and may cause dripping during combustion. Dripping can be the cause of the spread of fire during a conflagration. Suppressing dripping is, therefore, important in the flame-retarding technology.

An object of the present invention is to provide a flame-retardant resin composition exhibiting reduced bleed-out of the flame retarder, by copolymerizing a halogen-substituted styrene in the resin, and, further, by incorporating a fluorine-containing resin, to provide the resin composition with a high level of flame retardancy and reduced dripping phenomenon during combustion, as well as superior resistance to impact and excellent moldability. The resin composition can produce formed products with a superior external appearance.

SUMMARY OF THE INVENTION

Specifically, the object of the present invention is achieved by the provision of a flame-retardant resin composition comprising:

(A) 100 parts by weight of a bromine-containing copolymer composition containing 1 to 40% by weight of bromine and comprising (A-1) 0 to 100% by weight of a rubber . reinforced resin obtained by the polymerization of (a) 5 to 70 parts by weight of rubbery polymer and (b) 95 to 30 parts by weight of a monomer mixture which comprises 0 to 50% by weight of bromostyrene and 50 to 100% by weight of at least one monomer selected from the group consisting of aromatic vinyl monomers, excluding bromostyrene, cyanated vinyl monomers, (meth)acrylates, maleic anhydride, and malimide, provided that (a) plus (b) is 100 parts by weight, (A-2) 0 to 100% by weight of a copolymer obtained by the polymerization of 5 to 50 parts by weight of bromostyrene and 95 to 50 parts by weight of at least one monomer selected from the group consisting of aromatic vinyl monomers, excluding bromostyrene, cyanated vinyl monomers, (meth)acrylates, maleic anhydride, and malimide, and (A-3) 0 to 70% by weight of a copolymer obtained by the copolymerization of 50 to 100 parts by weight of bromostyrene and 0 to 50 parts by weight of at least one monomer selected from the group consisting of cyanated vinyl monomers, (meth)acrylates, maleic anhydride, and malimide;

(B) 0 to 30 parts by weight of a flame-retarding adjuvant; and (C) 0.05 to 30 parts by weight of an organopolysiloxane reinforced resin obtained by the polymerization of (c) 5 to 90 parts by weight of an organopolysiloxane polymer and 10 to 95 parts by weight of a vinyl monomer, provided that (c) plus (d) is 100 parts by weight.

DESCRIPTION OF THE PREFERRED EMBODIMENTS

Component (A) is a bromine-containing copolymer composition comprising 0 to 100% by weight of rubber-reinforced resin (A-1), 0 to 100% by weight of copolymer (A-2) and 0 to 70% by weight of copolymer A-3), and containing 1 to 40% by weight of bromine.

The rubber-reinforced resin (A-1) is obtained by the polymerization of 0 to 50% by weight, preferably 6 to 40% by weight, and most preferably 8 to 30% by weight of bromostyrene with 30 to 95% by weight, preferably 40 to 88% by weight, and most preferably 50 to 85% by weight of a monomer mixture (b) consisting of 50 to 100% by weight, preferably 60 to 94% by weight, and most preferably 70 to 92% by weight of at least one monomer selected from a group consisting of aromatic vinyl monomers (excluding bromostyrene), cyanated vinyl monomers, (meth)acrylates, maleic anhydride, and maleimide monomers, in the presence of 5 to 70 parts by weight, preferably 12 to 60 parts by weight, and most preferably 15 to 50 parts by weight of a rubber-like polymer (a).

Examples which can be given of the rubber-like polymer (a) include polybutadiene, butadiene-styrene copolymers, butadiene-bromostyrene copolymers, polyisoprene, butadiene-acrylonitrile copolymers, ethylene-propylene-(dienemethylene) copolymers, isobutylene-isoprene copolymers, acryl rubbers, styrene-butadiene-styrene block copolymers, styrene-butadiene-styrene radial tereblock copolymers, styrene-isoprene-styrene block copolymers, hydrogenated diene (block) copolymers such as SEBS and the like, polyurethane rubbers, silicone rubbers, and the like.

Of these, polybutadiene, butadiene-styrene copolymers, and ethylene-propylene-(dienemethylene) copolymers are preferable.

Examples which can be given of the bromostyrene used include monobromostyrene, dibromostyrene, and tribromostyrene.

Of these, dibromostyrene is the most preferable. Mixtures of these bromostyrenes can be used.

Examples which can be given of the aromatic vinyl monomers include styrene, α-methylstyrene, o-methylstyrene, m-methylstyrene, p-methylstyrene, chlorostyrene, dichlorostyrene, α-ethylstyrene, methyl- α-methylstyrene, dimethylstyrene, and the like.

Among these, styrene, α-methylstyrene, and p-methylstyrene are preferable.

Bromostyrene cannot be included in the above aromatic vinyl monomers.

Examples which can be given of the cyanated vinyl monomers include acrylonitrile, methacrylonitrile, and the like among these, acrylonitrile is particularly preferred.

Examples which can be given of the (meth)acrylates include methyl acrylate, ethyl acrylate, butyl acrylate, methyl methacrylate, butyl methacrylate, and the like. Methyl methacrylate is particularly preferred.

Examples of the maleimide monomers include maleimide, N-methylmaleimide, N-ethylmaleimide, N-propylmaleimide, N-isopropylmaleimide, N-cyclohexylmaleimide, N-(p-bromophenyl)maleimide, tribromophenylmaleimide, N-(p-chlorophenyl)maleimide, and the like.

Among these, maleimide, N-phenylmaleimide, N-cyclohexylmaleimide, and tribromophenylmaleimide, are particularly desirable.

If the amount of the rubber-like polymer (a) contained in the rubber-reinforced resin (A-1) is less than 5 parts by weight, the resistance to impact deteriorates; if greater than 70 parts by weight, the graft ratio, the surface glossiness of the resin, and the flame retardancy are lowered.

If the amount of bromostyrene contained in the monomer mixture (b) of the rubber-reinforced resin (A-1) exceeds 50% by weight, the moldability deteriorates.

The amount of bromostyrene-containing aromatic vinyl monomer in the monomer mixture (b) of the rubber-reinforced resin (A-1) is preferably 60 to 100% by weight, more preferably 70 to 85% by weight, and most preferably 72 to 80% by weight. The amount of aromatic vinyl copolymer within this range provides superior moldability characteristics to the resin composition.

The amount used of the one or more monomers selected from the group consisting of cyanated vinyl monomers, (meth)acrylates, maleic anhydride, and maleimide monomers is preferably between 0 to 40% by weight, more preferably 15 to 30% by weight, and most preferably 20 to 28% by weight. When the amount of monomer is within this range, superior moldability characteristics and excellent color tone are obtained.

The graft ratio of the rubber-reinforced resin (A-1) is preferably between 10 to 150%, and more preferably 20 to 120%. If the graft ratio is low, the resistance to impact deteriorates; if it is high, there is a tendency for dripping to occur during combustion.

The rubber-reinforced resin (A-1) can be polymerized using the block polymerization method, the solution polymerization method, the suspension polymerization method, the emulsion polymerization method, or the like.

Component (A-2) is obtained by the copolymerization of a monomer mixture consisting of 5 to 50 parts by weight, preferably 10 to 40 parts by weight, and most preferably 20 to 38 parts by weight of bromostyrene; and 50 to 95 parts by weight, preferably 60 to 90 parts by weight, and most preferably 62 to 80 parts by weight, of at least one monomer selected from a group consisting of aromatic vinyl monomers (excluding bromostyrene), cyanated vinyl monomers, (meth)acrylates, maleic anhydride, and maleimide monomers.

The bromostyrene, aromatic vinyl monomers, cyanated vinyl monomers, (meth)acrylates, maleic anhydride, and maleimide monomers used to prepare the copolymer (A-2) can be the same as those used for the rubber-reinforced resin (A-1).

If the amount of bromostyrene used in the copolymer (A-2) is less than 5 parts by weight, the flame retardancy deteriorates; if greater than 50 parts by weight, the moldability deteriorates.

The amount of bromostyrene and aromatic vinyl monomers used in the copolymer (A-2) is preferably 50 to 90 parts by weight, more preferably 60 to 80 parts by weight, and most preferably 65 to 78 parts by weight. The amounts of bromostyrene and aromatic vinyl monomers are within this range afford superior moldability characteristics to the resin composition.

The amount of the one or more monomers selected from the group consisting of cyanated vinyl monomers, (meth)acrylates, maleic anhydride, and maleimide monomers used in the copolymer (A-2) is preferably between 10 to 50 parts by weight, more preferably 20 to 40 parts by weight, and most preferably 22 to 35 parts by weight. The amount of monomer within this range gives superior moldability characteristics and color tone to the resin composition.

The intrinsic viscosity [Ω] of the copolymer (A-2) (measured at 30° C. in methyl ethyl ketone) is preferably 0.1 to 1.5 dl/gm, and more preferably 0.3 to 1.0 dl/gm. When [Ω] is less than 0.1 dl/gm, adequate impact strength is not exhibited. When [Ω] exceeds 1.5 dl/gm, the processability is decreased.

A preferable polymerization method for preparing copolymer (A-2) is initiating polymerization by the emulsion polymerization reaction using 0 to 40% by weight of the monomer mixture, and continuously adding the remaining 60 to 100% by weight of the monomer mixture at a rate slower than the polymerization rate of the monomers, until the polymerization conversion rate is greater than 80%.

Copolymer (A-2) polymerized by the above-mentioned method contains bromostyrene incorporated more uniformly throughout the copolymer and exhibits a greater flame retarding effect than copolymers synthesized by other polymerization methods.

Besides the above method, copolymer (A-2) can be polymerized by the block polymerization method, the solution polymerization method, the suspension polymerization method, the emulsion polymerization method, or the like.

A specific example of copolymer (A-2) is a dibromostyrene-acrylonitrile-styrene ternary copolymer.

Copolymer (A-3) is obtained by the copolymerization of 50 to 100 parts by weight, preferably 55 to 85 parts by weight, and most preferably 60 to 80 parts by weight of an aromatic vinyl monomer (excluding bromostyrene), and 0 to 50 parts by weight, preferably 15 to 45 parts by weight, and most preferably 20 to 40 parts by weight of a monomer mixture of at least one monomer selected from the group consisting of cyanated vinyl monomers, (meth)acrylates, maleic anhydride, and maleimide monomers.

The aromatic vinyl monomers, cyanated vinyl monomers, (meth)acrylates, maleic anhydride, and maleimide monomers used to form the copolymer (A-3) can be the same as those used for the rubber-reinforced resin (A-1).

If the amount of aromatic vinyl monomers used in the copolymer (A-3) is less than 50 parts by weight, the moldability deteriorates.

On the other hand, if the amount of the monomer mixture of at least one monomer selected from a group consisting of cyanated vinyl monomers, (meth)acrylates, maleic anhydride, and maleimide monomers in the copolymer (A-3) exceeds 50 parts by weight, the moldability characteristics and color tone deteriorate.

The intrinsic viscosity $[\Omega]$ of the copolymer (A-3) is preferably 0.1 to 1.5 dl/gm, and more preferably 0.3 to 1.0 dl/gm. When $[\Omega]$ is less than 0.1 dl/gm, adequate impact strength is not exhibited. When $[\Omega]$ exceeds 1.5 dl/gm, the moldability is decreased.

Copolymer (A-3) can be polymerized by the block polymerization method, the solution polymerization method, the suspension polymerization method, the emulsion polymerization method, or the like.

Proportions of the rubber-reinforced resin (A-1), the copolymer (A-2), and the copolymer (A-3) which make up the bromine-containing copolymer composition (A) will now be described in detail.

The component (A) is a blend of 0 to 100% by weight, preferably 0 to 70% by weight, more preferably 20 to 65% by weight, and most preferably 30 to 55% by weight of the copolymer (A-2); and 0 to 70% by weight, preferably 5 to 45% by weight, more preferably 10 to 30% by weight of the copolymer (A-3); for 0 to 100% by weight, preferably 30 to 100% by weight, more preferably 35 to 80% by weight, and most preferably 40 to 70% by weight of the rubber-reinforced resin (A-1).

Incorporation of the rubber-reinforced resin (A-1) in an amount greater than 30% by weight particularly promotes the resistance to impact.

The amount of copolymer (A-2) exceeding 70% by weight impairs the flame retardancy.

The bromine-containing copolymer composition (A) contains 1 to 40% by weight, preferably 2 to 25% by weight, and more preferably 3 to 15% by weight of bromine. When the bromine in the bromine-containing copolymer composition (A) is less than 1% by weight, the flame retardancy deteriorates; when the bromine content exceeds 40% by weight, the moldability characteristics and the external appearance deteriorate.

The intrinsic viscosity $[\Omega]$ of the matrix resin of the bromine-containing copolymer composition (A) is preferably 0.1 to 1.5 dl/gm, and more preferably 0.3 to 1.0 dl/gm. When $[\Omega]$ is less than 0.1 dl/gm, adequate impact strength is not exhibited. When $[\Omega]$ exceeds 1.5 dl/gm, the molding processability is decreased. The matrix resin is defined here as the resin component other than the grafted rubber component in the bromine-containing copolymer composition (A). The intrinsic viscosity $[\Omega]$ is the value obtained by the measurement of the methyl ethyl ketone soluble portion in the bromine-containing copolymer composition (A) according to the conventional method.

The bromine-containing copolymer composition (A) may have the following combinations:

(1) component (A-1) only (2) component (A-1) and component (A-2)

(3) component (A-1) and component (A-3)

(4) component (A-1), component (A-2) and component (A-3)

(5) component (A-2) and component (A-3)

(6) component (A-2) only.

Desirable types of component (A-1) are as follows:

(1) A rubber-reinforced resin obtained by the polymerization of bromostyrene with other aromatic vinyl monomers in the presence of a rubber-like polymer.

(2) A rubber-reinforced resin obtained by the polymerization of an aromatic vinyl monomer (excluding bromostyrene) in the presence of a rubber-like polymer.

(3) A rubber-reinforced resin obtained by the polymerization of bromostyrene with an aromatic vinyl monomer and acrylonitrile in the presence of a rubber-like polymer.

(4) A rubber-reinforced resin obtained by the polymerization of an aromatic vinyl monomer and acrylonitrile in the presence of a rubber-like polymer.

Desirable types of the (A-2) component are as follows:

(1) A copolymer obtained by the polymerization of bromostyrene with other aromatic vinyl monomers.

(2) A copolymer obtained by the copolymerization of bromostyrene with other aromatic vinyl monomers and acrylonitrile.

Desirable types of the (A-3) component are as follows:

(1) A copolymer obtained by the copolymerization of aromatic vinyl monomers and acrylonitrile.

(2) A polymer obtained by the polymerization of aromatic vinyl monomers.

The component (A) of the present invention can be obtained by suitable use of the above-mentioned components (A-1), (A-2), and (A-3).

A particularly desirable bromine-containing copolymer composition (A) is a resin composition comprising ABS resin and a ternary copolymer of dibromostyrene-acrylonitrile-styrene.

Component (B) is a flame-retarding adjuvant. The amount of the flame-retarding adjuvant (B) used is 0 to 30 parts by weight, preferably 1 to 20 parts by weight, and most preferably 4 to 15 parts by weight, for 100 parts by weight of the component (A). When the amount of the flame-retarding adjuvant (B) exceeds 30 parts by weight, the impact resistance of the resin is reduced.

Examples which can be given of the flame-retarding adjuvant (B) include metallic oxides such as antimony compounds and zinc-borate compounds. Of these, antimony compounds are preferable.

Specific examples include antimony trioxide, antimony tetraoxide, (colloidal) antimony pentoxide, sodium antimonate, antimony phosphate, and the like. Of these examples, antimony trioxide is particularly desirable.

A remarkable flame retardance effect is obtained by the use of the above-mentioned flame-retarding adjuvants in conjunction with bromine-containing compounds.

The greatest feature of the present invention resides in the incorporation of component (C), which greatly promotes the flame retardancy and suppresses the dripping phenomenon of the flame-retardant resin, accompanied by the improvement in the impact resistance without loss of the superior moldability and surface appearance of the articles molded from the resin.

The component (C) is a polyorganosiloxane-reinforced resin obtained by polymerizing 10 to 95 parts by weight, preferably 30 to 90 parts by weight, and most preferably 40 to 80 by weight, of a vinyl monomer (d) in the presence of 5 to 90 parts by weight, preferably 10 to 70 parts by weight, and most preferably 20 to 60 parts by weight, of a polyorganosiloxane polymer (c), provided that (c) + (d) equals 100 parts by weight.

A superior flame-retardancy is obtained and the dripping phenomenon is suppressed when the amount of the incorporated polyorganosiloxane polymer (c) falls within the range outlined above.

In addition, use of polyorganosiloxane polymer (c) with which a graft crossing agent has been condensed is also possible.

The amount of the above-mentioned graft crossing agent used in the polyorganosiloxane polymer (c) is preferably 0.1 to 50% by weight, more preferably 0.2 to 10% by weight, and most preferably 0.5 to 5% by weight. The amount of graft crossing agent in this range provides component (C) with superior characteristics, resulting in a flame-retardant resin composition with remarkably excellent characteristics aimed in the present invention.

Here, the organosiloxane is made up of a structural unit represented by the formula $R^1{}_n SiO_{(4-n)/2}$, wherein R1 is substituted or unsubstituted monovalent hydrocarbon group and n is an integer from 0 to 3. The organosiloxane may be linear, branched, or cyclic, with a cyclic structure being preferable.

Examples of substituted or unsubstituted monovalent hydrocarbon groups contained in these organosiloxanes may be a hydrocarbon group such as methyl, ethyl, propyl, vinyl, or phenyl group, which may be substituted with halogen atoms or cyano groups.

Specific examples of organosiloxanes include cyclic compounds such as hexamethylcyclotrisiloxane, octamethylcyclotetrasiloxane, decamethylcyclopentasiloxane, dodecamethylcyclohexasiloxane, trimethyltriphenylcyclotrisiloxane, and the like as well as linear or branched organosiloxanes.

These organosiloxanes may also be polystyrene-substituted polyorganosiloxanes condensed in advance and having a weight average molecular weight, converted to polystyrene, of about 500 to 10,000.

When the organosiloxane is a polyorganosiloxane, its molecular chain terminal may be blocked with, for example, a hydroxyl group, an alkoxy group, a trimethylsilyl group, a dimethylvinylsilyl group, a methylphenylvinylsilyl group, or the like.

The following graft crossing agents can be used in the present invention.

(1) A graft crossing agent having both an unsaturated group and an alkoxysilyl group and represented by the following formula,

wherein $R^2$ represents a hydrogen atom or an alkyl group with 1 to 6 carbon atoms.

(2) $R^3{}_p SiO_{(3-p)/2}$, wherein R3 is a vinyl group or an allyl group, and p is an integer from 0 to 2. Specific examples include vinylmethyldimethoxysilane, tetravinyltetramethylcyclosiloxane, allylmethyldimethoxysilane, and the like.

(3) $HSR^4 SiR^5{}_q O_{(3-q)/2}$, wherein $R^4$ is a divalent or trivalent saturated aliphatic hydrocarbon group with 1 to 18 carbon atoms, $R^5$ is a monovalent hydrocarbon group with 1 to 6 carbon atoms which does not contain an unsaturated aliphatic group, and q is an integer from 0 to 2). A specific example which can be given is t-mercaptopropylmethyldimethoxysilane.

(4) Compounds of the following formula,

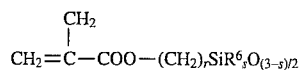

wherein R6 represents a hydrogen atom, methyl group, ethyl group, propyl group, or phenyl group; r is an integer from 1 to 6; and s is an integer from 0 to 2. A specific example is t-methacryloxypropylmethyldimethoxysilane.

A particularly desirable example of these graft crossing agents is a compound represented by the formula having both an unsaturated group and an alkoxysilyl group given in (1) above.

To describe the graft crossing agent in more detail, $R^2$ in the above formula is preferably a hydrogen atom or an alkyl group with 1 or 2 carbon atoms, and, more preferably, a hydrogen atom or methyl group.

Specific examples of the graft crossing agent include p-vinylphenylmethyldimethoxysilane, 1-(m-vinylphenyl)methyldimethylisopropoxysilane, 2-( p-vinylphenyl) ethylmethyldimethoxysilane, 2-( m-vinylphenyl) ethylmethyldimethoxysilane, 2-( o-vinylphenyl) ethylmethyldimethoxysilane, 1-( m-vinylphenyl) ethylmethyldimethoxysilane, 1-( o-vinylphenyl) ethylmethyldimethoxysilane, 1-( p-vinylphenyl) ethylmethyldimethoxysilane, 3-( p-vinylphenoxy )propylmethyldimethoxysilane, 3-( p-vinylbenzoyl oxy)propylmethyldimethoxysilane, 1-(o-vinyl phenyl)-1,1,2-trimethyl-2,2-dimethoxysilane, 1-(p-vinyl phenyl)-1,1diphenyl-3-ethyl-3,3-diethoxydisiloxane m-vinylphenyl-(3-(triethoxysilyl)propyl)-diphenylsilane, (3-(p-isopropenylbenzoylamino)propyl)phenyldipropoxysilane, and the like, as well as mixtures of these compounds.

The more desirable graft crossing agents are p-vinylphenylmethyldimethoxysilane, 2-(m-vinylphenyl) ethylmethyldimethoxysilane, 2-(o-vinylphenyl) ethylmethyldimethoxysilane, 1-(m-vinylphenyl) ethylmethyldimethoxysilane, 1-(o-vinylphenyl) ethylmethyldimethoxysilane, 3-(p-vinylbenzoyloxy) propylmethyldimethoxysilane, and the moss desirable of these is p-vinylphenylmethyldimethoxysilane The use of these graft crossing agents promotes the graft ratio of the resulting resin composition, providing ideal characteristics of the composition which is the target of the present invention.

The polyorganosiloxane polymer (c) can be manufactured by the condensation by mixing the above-mentioned organosiloxane and graft crossing agent, with shearing, using a homogenizer, in the presence of an emulsifier such as, for example, alkylbenzenesulfonate. At this time, the emulsifier acts as a condensation initiator in addition to its function of emulsifying the organosiloxane. The amount of the emulsifier used is normally 0.1 to 5% by weight, and preferably 0.3 to 3% by weight, of the combined weights of the organosiloxane and the graft crossing agent.

The amount of water used at this time is normally 100 to 500 parts by weight, and preferably 200 to 400 parts by weight, for 100 parts by weight, of the organosiloxane plus the graft crossing agent.

The condensation temperature is normally 5° to 100° C.

The impact resistance can be improved by the addition of a cross-linking agent as a third component during the manufacture of the polyorganosiloxane polymer (c).

Examples of such a cross-linking agent include trifunctional cross-linking agents such as methyltrimethoxysilane, phenyltrimethoxysilane, ethyltriethoxysilane, and the like, and tetrafunctional cross-linking agents such as tetraethoxysilane, and the like. The amount of cross-linking agent added is normally 10% by weight or less, and preferably 5% by weight or less, of the total weights of the organosiloxane and the graft crossing agent.

The average molecular weight, converted to polystyrene, of the polyorganosiloxane polymer (c) obtained in this manner is normally 10,000 to 1,000,000, and preferably 50,000 to 500,000.

The above-mentioned component (C) is a polyorganosiloxane-reinforced resin obtained by the copolymerizing the vinyl monomer (d) in the presence of the polyorganosiloxane polymer (c) obtained in the above manner.

Examples of the vinyl monomer (d) used in component (C) include the aromatic vinyl monomers, cyanated vinyl monomers, (meth)acrylates, maleic anhydride, and maleimide monomers, used in component (A). These vinyl monomers may be used individually or mixed.

Desirable combinations and proportions for the vinyl monomer (d) are as follows:

(1) Aromatic vinyl monomer/(meth)acrylate=5 to 95/95 to 5 wt %;

(2) Aromatic vinyl monomer/cyanated vinyl monomer= 50 95/50 to 5 wt %;

(3) (Meth)acrylate/cyanated vinyl monomer=50 to 95/50 to 5 wt %;

(4) Aromatic vinyl monomer/(meth)acrylate/cyanated vinyl monomer = 3 to 95/3 to 95/2 to 50 wt %.

The use of the above mixtures (1) to (4) as the vinyl monomer (d) for the manufacture of the polyorganosiloxane-reinforced resin (C) greatly improves the characteristic of the flame-retardant resin composition aimed by the present invention.

The graft ratio of the component (C) obtained in this manner is normally 10% by weight or greater, preferably 30% by weight or greater, and more preferably 50% by weight or greater When the graft ratio of component (C) is within the above range, the polyorganosiloxane polymer uniformly dispersed throughout the graft copolymer and the vinyl polymer which is not directly grafted, providing component (C) which is capable of giving a good external appearance and excellent characteristics to the resin composition.

Component (C) further contains non-grafted vinyl polymers formed by the polymerization without grafting to the polyorganosiloxane polymer (c).

Included also in component (C), besides graft copolymers obtained by the polymerization of the above vinyl monomers (d) in the presence of the polyorganosiloxane polymer (c), are those obtained by incorporating vinyl polymers which can be prepared by separately polymerizing said graft copolymer with said vinyl monomer (d).

The component (C) is obtained by the radical polymerization of the vinyl monomer (d) in the presence of the polyorganosiloxane polymer (c).

The amount of the component (C) used is 0.05 to 30 parts by weight, preferably 0.5 to 25 parts by weight, more preferably 5 to 20 parts by weight, and most preferably 8 to 15 parts by weight, for 100 parts by weight of the component (A).

If the amount of the component (C) used is less than 0.05 parts by weight, the flame retardancy is reduced and dripping during combustion cannot be prevented. If the amount exceeds 30 parts by weight, the surface appearance of the resin is poor.

The amount of the rubber-like polymer (a) in the flame-retardant resin composition of the present invention is preferably 0 to 40% by weight, more preferably 5 to 30% by weight, and most preferably 8 to 25% by weight.

If the amount of the rubber-like polymer exceeds 40% by weight, the flame retardancy drops undesirably.

The ratio of bromine in the flame-retardant resin composition of the present invention is preferably 1 to 30% by weight, more preferably 5 to 20% by weight, and most preferably 6 to 15% by weight. When the bromine is less than 1% by weight, an adequate flame retardancy cannot be obtained; when the bromine content exceeds 30% by weight, the moldability characteristics and outer appearance of the product are reduced.

Flame retarders can be added to the flame-retardant resin composition of the present invention, as required. The amount of these flame retarders used is preferably 0.5 to 10 parts by weight, more preferably 1 to 8 parts by weight, and most preferably 2 to 6 parts by weight, for 100 parts by weight of the component (A). When the amount of flame retarders added is less than 0.5 parts by weight, the effect of the addition is insufficient. On the other hand, when the amount exceeds 10 parts by weight, the molding processability deteriorates.

Examples of the above-mentioned flame retarders include halogen compounds and phosphorous compounds. Of these, halogen compounds are more preferable.

Specific examples are tetrabromobisphenol A, oligomers of tetrabromobisphenol A, and their derivatives. Additional examples are post-brominated polystyrene, dibromostyrene homopolymer, and tribromostyrene homopolymer, and the like. The amount of bromine in these bromine-containing compounds is preferably 40 to 65% by weight, and more preferably 50 to 60% by weight. Examples of phosphorous-containing compounds include triphenyl phosphate, tricresyl phosphate, and the like.

One or more polymers selected from polycarbonate, PPS, PPO, POM, polyamide, PBT, PET, polyvinyl chloride, polyolefin, polyacetal, epoxy resin, polyurethane, vinylidene fluoride, and thermoplastic elastomers can be blended into the flame-retardant resin composition of the present invention as required. The preferable amount to be blended in is 20 to 95% by weight of the above polymers to 5 to 80% by weight of the flame-retardant resin composition of the present invention. In particular, a composition with superior flame retardancy can be obtained by using polycarbonate, PPS, PPO, POM, polyamide, PBT, PET, polyvinyl chloride, polyacetal, epoxy resin, or polyurethane.

Additives which can be mixed into the flame-retardant resin composition of the present invention, as required, include antioxidants, stabilizers, e.g., ultraviolet absorbents;

lubricants, e.g., silicone oil, low molecular weight polyethylene, etc.; fillers, e.g., calcium carbonate, talc, clay, titanium oxide, silica, magnesium carbonate, carbon black, barium sulfate, calcium oxide, aluminum oxide, mica, glass beads, glass fiber, metal fillers, etc.; dispersants, foaming agents, colorants, and the like.

The flame-retardant resin composition of the present invention can be formed into products by extrusion molding, injunction molding, compression molding, or the like. The products formed are superior in flame retardancy, impact resistance, and molding processability, and also have a good external appearance. For this reason, they are extremely useful in household products, electrical appliances, OA equipment, and the like, and for automotive products and building materials.

EXAMPLES

The present invention will be described in more detail by way of exemplary embodiments which are given for illustration of the invention and are not intended to be limiting thereof.

(1) Manufacture of rubber-reinforced resin (A-1)

Into a separable flask equipped with a reflux condenser, a thermometer, and a stirrer, were charged 30 parts by weight (solid portion) of polybutadiene rubber latex, 65 parts by weight of ion exchanged water, 0.3 part by weight of rosin soap, 1.8 parts by weight of dibromostyrene, 11.7 parts by weight of styrene, and 7.5 parts by weight of acrylonitrile. A solution of 0.2 part by weight of sodium pyrophosphate, 0.01 part by weight of $FeSO_{4\cdot 7H_2O}$, and 0.4 part by weight of fructose dissolved in 20 parts by weight of ion exchanged water was added to the above mixture.

Then, 0.07 part by weight of cumene hydroperoxide were added to initiate the polymerization. After one hour of the polymerization, 45 parts by weight of ion exchanged water, 0.7 part by weight of rosin soap, 4.2 parts by weight of dibromostyrene, 27.3 parts by weight of styrene, 17.5 parts by weight of acrylonitrile, and 0.01 part by weight of cumene hydroperoxide were added continuously over a period of two hours, followed by an additional one hour polymerization to complete the reaction.

The copolymer latex obtained in this manner was coagulated by the addition of sulfuric acid, washed with water, and dried, to obtain the rubber-reinforced resin [(A-1)-3 in Table 1].

The rubber-reinforced resins (A-1)-1, (A-1)-2, (A-1)-4, and (A-1)-5 shown in the following Table 1 were obtained in the same manner.

TABLE 1

| Preparation of Rubber-Reinforced Resin (A-1) | | | | | |
|---|---|---|---|---|---|
| | 1 | 2 | 3 | 4 | 5 |
| Composition of Graft Copolymer | | | | | |
| Polybutadiene (part) | 35 | 45 | 30 | 80 | 30 |
| Monomer mixture (b) (part) | 65 | 55 | 70 | 20 | 70 |
| Styrene (wt %) | 62 | 100 | 56 | 0 | 35 |
| Acrylonitrile (wt %) | 38 | 0 | 36 | 100 | 25 |
| Bromostyrene (wt %) | 0 | 0 | 8 | 0 | 40 |
| [Ω] (MEK soluble components, 30° C.) dl/g | 0.60 | 0.45 | 0.35 | 0.35 | 0.40 |
| Graft Ratio | 80 | 60 | 50 | 20 | 45 |
| Bromine content (%) | 0 | 0 | 3.6 | 0 | 17.1 |

(2) Manufacture of copolymer (A-2)

Into a separable flask equipped with a reflux condenser, a thermometer, and a stirrer, 250 parts by weight of ion exchanged water, 3.0 parts by weight of potassium laurate, 8.1 parts by weight of dibromostyrene, 14.4 parts by weight of styrene, 7.5 parts by weight of acrylonitrile, and 0.03 part by weight of t-dodecylmercaptan were charged. A solution made up of 0.05 part by weight of sodium ethylenediamine tetraacetate, 0.002 part by weight of $FeSO_{4\cdot 7H_2O}$, and 0.1 part by weight of sodium formaldehyde sulfoxylate dissolved in 8 parts by weight of ion exchanged water was added to the above mixture.

Then, 0.025 part by weight of diisopropylbenzene hydroperoxide was added to initiate the polymerization. After one hour of polymerization, 18.9 parts by weight of dibromostyrene, 33.6 parts by weight of styrene, 17.5 parts by weight of acrylonitrile, 0.09 part by weight of t-dodecylmercaptan, and a solution made up of 0.05 part by weight of sodium ethylenediamine tetraacetate, 0.002 part by weight of $FeSO_{4\cdot 7H_2O}$, and 0.1 part by weight of sodium formaldehyde sulfoxylate dissolved in 8 parts by weight of ion-exchanged water were added continuously over a period of five hours, followed by an additional one hour polymerization to complete the reaction.

The copolymer latex obtained in this manner was coagulated by the addition of sulfuric acid, washed with water, and dried, to obtain a copolymer [(A-2)-1 in Table 2].

The copolymers (A-2)-2 to (A-2)-4 shown in Table 2 were obtained in the same manner.

TABLE 2

| Preparation of Copolymer (A-2) | | | | |
|---|---|---|---|---|
| | 1 | 2 | 3 | 4 |
| Dibromostyrene (wt %) | 27 | 33 | 4 | 60 |
| Styrene (wt %) | 48 | 57 | 88 | 20 |
| Acrylonitrile (wt %) | 25 | 10 | 8 | 20 |
| [Ω] (MEK soluble components, 30° C.) dl/g | 0.60 | 0.65 | 0.55 | 0.50 |
| Bromine content (%) | 16.7 | 20.5 | 2.5 | 37.2 |

(3) Manufacture of copolymer (A-3)

Into a separable flask equipped with a reflux condenser, a thermometer, and a stirrer, 250 parts by weight of ion-exchanged water, 3.0 parts by weight of potassium laurate, 76 parts by weight of styrene, 24 parts by weight of acrylonitrile, and 0.01 part by weight of t-dodecylmercaptan were charged. A solution made up of 0.05 part by weight of sodium ethylenediamine tetraacetate, 0.002 part by weight of $FeSO_{4\cdot 7H_2O}$, and 0.1 part by weight of sodium formaldehyde sulfoxylate dissolved in 8 parts by weight of ion exchanged water was added to the above mixture.

Then, 0.1 part by weight of diisopropylbenzene hydroperoxide was added to initiate the polymerization. The reaction was completed after about one hour of polymerization.

The copolymer latex obtained in this manner was coagulated by the addition of sulfuric acid, washed with water, and dried, to obtain a copolymer [(A-3)-1 in Table 3].

The copolymers (A-3)-2 to (A-3)-4 shown in Table 3 were obtained in the same manner.

TABLE 3

| Preparation of Copolymer (A-3) | | | | |
|---|---|---|---|---|
| | 1 | 2 | 3 | 4 |
| Composition of Graft Copolymer | | | | |
| Styrene (wt %) | 76 | 72.5 | 100 | 20 |

TABLE 3-continued

| Preparation of Copolymer (A-3) | | | | |
|---|---|---|---|---|
| | 1 | 2 | 3 | 4 |
| Acrylonitrile (wt %) | 24 | 27.5 | 0 | 80 |
| [Ω] (MEK soluble components, 30° C.) dl/g | 0.55 | 0.70 | 0.60 | 0.55 |

(4) Manufacture of polyorganosiloxane-reinforced resin component (C)

(4-1) Manufacture of polyorganosiloxane copolymer (c)

1.5 parts by weight of p-vinylphenylmethyl-dimethoxysilane and 98.5 parts by weight of octamethylcyclotetrasilane were mixed and dispersed for three minutes in a solution of 2.0 part by weight of dodecylbenzenesulfonic acid dissolved in 300 parts by weight of distilled water, using a homogenizer.

This mixed solution was placed in a separable flask equipped with a condenser, a nitrogen port, and a stirrer, and heated to 90° C. for 6 hours while stirring. The condensation reaction was completed by cooling for 24 hours at 5° C.

The condensation ratio of the octamethylcyclotetrasiloxane in the resulting polyorganosiloxane copolymer was 92.8%. This polyorganosiloxane copolymer latex (component (c)) was neutralized to pH 7 with a sodium carbonate solution.

(4-2) Manufacture of polyorganosiloxane-reinforced resin component (C)

Batch polymerization components consisting of 100 parts by weight of ion-exchanged water, 0.5 part by weight of sodium dodecylbenzenesulfonate, 0.01 part by weight potassium hydroxide, 0.1 part by weight t-dodecylmercaptan, 40 parts by weight of the above-mentioned polyorganosiloxane copolymer (c), 15 parts by weight styrene, and 5 parts by weight acrylonitrile were placed in a glass flask with a 7-liter internal capacity, equipped with a stirrer, and heated with stirring.

When a temperature of 45° C. was reached, an aqueous solution of an activator solution made up of 0.1 part by weight of sodium ethylenediamine tetraacetate, 0.003 part by weight of $FeSO_{4\cdot 7H_2O}$, and 0.2 part by weight of sodium formaldehyde sulfoxylate dihydride dissolved in 8 parts by weight of ion-exchanged water, and 15 parts by weight of ion-exchanged water, together with 0.1 part by weight of diisopropylbenzene hydroperoxide were added and the reaction was continued for one hour.

In addition, a mixture of increment polymer components made up of 50 parts by weight ion-exchanged water, 1 part by weight of sodium dodecylbenzenesulfonate, 0.02 part by weight of potassium hydroxide, 0.1 part by weight of t-dodecylmercaptan, 0.2 part by weight diisopropylbenzene hydroperoxide, 30 parts by weight of styrene, and 10 parts by weight of acrylonitrile were added continuously, and the reaction was continued over a period of three hours.

After the addition was completed, the reaction was continued for an additional one hour with stirring, then 0.2 part by weight of 2, 2-methylene-bis-(4-ethylene -6-t-butylphenol) was added and the reaction was removed from the flask.

The product was then coagulated using 2 parts by weight of potassium choloride, dehydrated, washed, and dried, to obtain a powdered polyorganosiloxane-reinforced resin component (C) [(1) in Table 4].

The polyorganosiloxane-reinforced resin component (C) (2) shown in Table 4 was obtained in the same manner.

TABLE 4

| Preparation of Polyorganosiloxane-reinforced Resin (C) | | |
|---|---|---|
| | 1 | 2 |
| Batch Polymerization Feed Composition (part) | | |
| Polyorganosiloxane Polymer (C) | 40 | 40 |
| Styrene | 15 | — |
| Acrylonitrile | 5 | — |
| Methyl methacrylate | — | 20 |
| Increment Polymerization Feed Composition (part) | | |
| Styrene | 30 | — |
| Acrylonitrile | 10 | — |
| Methyl methacrylate | — | 40 |
| Polymerization Conversion Rate (%) | 98.7 | 98.8 |
| Graft Ratio (%) | 96 | 94 |
| Intrinsic Viscosity (dl/g) | 0.51 | 0.50 |

(5) Manufacture of flame-retardant resin composition

The components shown in Table 5 were molten and kneaded in a temperature range of 190° C. to 240° C., and extruded from an extruder with an inner diameter of 50 mm to produce pellets. Antimony trioxide was used as the flame-retarding adjuvant (B).

Test specimens were prepared from these pellets in a temperature range of 200° C. to 240° C., using a 5 oz. injection molding machine to evaluate their characteristics.

The evaluation methods used were as follows.

(Izod impact strength) ASTM D256 ¼", 23° C., notched.
(Combustion test) Conforms to UL-94. Size of test leaf: 1/16"×½"×5"

TABLE 5

| <Example Compositions 1–5> | | | | | |
|---|---|---|---|---|---|
| | 1 | 2 | 3 | 4 | 5 |
| (A) Bromine-containing Copolymer Composition (part) | 100 | 100 | 100 | 100 | 100 |
| (A-1) Rubber Reinforced Resin (wt %) | | | | | |
| (1) | 35 | — | — | — | — |
| (2) | — | 35 | — | — | — |
| (3) | — | — | 40 | — | — |
| (4) | — | — | — | — | — |
| (5) | — | — | — | — | 60 |
| (A-2) Copolymer (wt %) | | | | | |
| (1) | 65 | — | 50 | — | — |
| (2) | — | 45 | — | 50 | — |
| (3) | — | — | — | — | — |
| (4) | — | — | — | — | — |
| (A-3) Copolymer (wt %) | | | | | |
| (1) | — | — | 10 | — | 40 |
| (2) | — | 20 | — | — | — |
| (3) | — | — | — | 50 | — |
| (4) | — | — | — | — | — |
| (B) Frame Retarding Adjuvant $Sb_2O_3$ (part) | 6 | 6 | 8 | 8 | 10 |
| (C) Polyorganosiloxane-reinforced Resin (part) | | | | | |
| (1) | 8 | 12 | — | 30 | 10 |
| (2) | — | — | 10 | — | — |
| Flame Retardant TBA Oligomer (Br content 54%) (part) | — | — | 4 | 2 | 4 |
| Rubber Content (as Butadiene) | 10.7 | 13.3 | 9.9 | — | 14.5 |

TABLE 5-continued

<Example Compositions 1–5>

|  | 1 | 2 | 3 | 4 | 5 |
|---|---|---|---|---|---|
| (wt %) |  |  |  |  |  |
| Bromine Content (wt %) | 9.5 | 7.9 | 9.8 | 8.2 | 10.0 |
| Flame Retardancy UL-94 (⅛") | V-0 | V-0 | V-0 | V-0 | V-0 |
| Izodt (kg/cm$^2$) | 9 | 11 | 10 | 4 | 10 |
| Appearance* | ○ | ○ | ○ | ○ | ○ |
| Molding Processability** | ○ | ○ | ○ | ○ | ○ |

*Judged by observation by naked eyes.
**Judged upon injection molding.

TABLE 6

<Comparative Compositions 1–5>

|  | 1 | 2 | 3 | 4 | 5 |
|---|---|---|---|---|---|
| (A) Bromine-containing Copolymer Composition (part) | 100 | 100 | 100 | 100 | 100 |
| (A-1) Rubber Reinforced Resin (wt %) |  |  |  |  |  |
| (1) | — | 30 | 10 | 35 | 35 |
| (2) | — | — | — | — | — |
| (3) | — | — | — | — | — |
| (4) | 60 | — | — | — | — |
| (5) | — | — | — | — | — |
| (A-2) Copolymer (wt %) |  |  |  |  |  |
| (1) | — | — | — | 65 | — |
| (2) | 40 | — | — | — | 5 |
| (3) | — | 70 | — | — | — |
| (4) | — | — | 90 | — | — |
| (A-3) Copolymer (wt %) |  |  |  |  |  |
| (1) | — | — | — | — | — |
| (2) | — | — | — | — | — |
| (3) | — | — | — | — | — |
| (4) | — | — | — | — | 60 |
| (B) Flame Retarding Adjuvant Sb$_2$O$_3$ (part) | 4 | 6 | 6 | 40 | 10 |
| (C) Polyorganosiloxane-Reinforced Resin (part) |  |  |  |  |  |
| (1) | 4 | — | — | 10 | 10 |
| (2) | — | 10 | 10 | — | — |
| Flame Retardant TBA Oligomer (Br content 54%) (part) | 2 | — | 10 | — | 5 |
| Rubber Content (as Butadiene) (wt %) | 43.6 | 9.1 | 0.03 | 8.2 | 9.8 |
| Bromine Content (wt %) | 8.4 | 0.02 | 30.9 | 7.2 | 3.0 |
| Flame Retardancy UL-94 (⅛") | V-2 | notV | V-0 | V-2 | notV |
| Izodt (kg/cm$^2$) | 28 | 8 | 1 | 1 | 4 |
| Appearance* | X | ○ | X | Δ | X |
| Molding Processability** | Δ | ○ | Δ | Δ | X |

*Judged by observation by naked eyes.
**Judged upon injection molding.

TABLE 7

<Comparative Compositions 6–8>

|  | 6 | 7 | 8 |
|---|---|---|---|
| (A) Bromine-containing Copolymer Composition (part) | 100 | 100 | 100 |
| (A-1) Rubber Reinforced Resin (wt %) |  |  |  |
| (1) | 35 | — | — |
| (2) | — | 35 | 40 |
| (3) | — | — | — |
| (4) | — | — | — |
| (5) | — | — | — |
| (A-2) Copolymer (wt %) |  |  |  |
| (1) | — | — | 40 |
| (2) | — | 45 | — |
| (3) | — | — | — |
| (4) | 60 | — | — |
| (A-3) Copolymer (wt %) |  |  |  |
| (1) | 5 | — | 20 |
| (2) | — | 20 | — |
| (3) | — | — | — |
| (4) | — | — | — |
| (B) Flame Retarding Adjuvant Sb$_2$O$_3$ (part) | 10 | 6 | 8 |
| (C) Polyorganosiloxane-Reinforced Resin (part) |  |  |  |
| (1) | 10 | 0 | 0 |
| (2) | — | 0 | 50 |
| Flame Retardant TBA Oligomer (Br content 54%) (part) | — | — | — |
| Rubber Content (as Butadiene) (wt %) | 10.2 | 14.9 | 11.3 |
| Bromine Content (wt %) | 18.6 | 8.7 | 4.2 |
| Flame Retardancy UL-94 (⅛") | V-0 | V-2 | V-2 |
| Izodt (kg/cm$^2$) | 3 | 8 | 11 |
| Appearance* | Δ | ○ | X |
| Molding Processability** | Δ | Δ | Δ |

*Judged by observation by naked eyes.
**Judged upon injection molding.

As can be clearly understood from the results shown in Tables 5 to 7, the compositions of Examples 1 to 5 exhibit superior flame retardancy. As a result, the dripping phenomenon is not produced. These compositions also show superior impact resistance, moldability, and outer appearance.

As opposed to this Comparative Example 1 is an example of a composition containing an amount of rubber-like polymer exceeding the range of the present invention. The flame retardancy is therefore inferior.

The Comparative Examples 2 and 3 contain bromine throughout the flame-retardant resin compositions in amounts outside of the range of the present invention. Comparative Example 2, in which the bromine content is too low, has an inferior flame retardancy. Comparative Example 3, in which the bromine content is too high, has a poor surface appearance.

The amount of component (B) contained in Comparative Example 4 exceeds the range of the present invention. The impact resistance is therefore inferior.

The amount of styrene contained in the copolymer component (A-3) used for Comparative Example 5 is below the range of the present invention. The impact resistance and moldability are therefore inferior.

The amount of bromostyrene contained in the copolymer component (A-2) used for Comparative Example 6 exceeds the range of the present invention. The surface appearance and impact resistance are therefore inferior.

Compositions of Comparative Examples 7 and 8 contain amounts of the polyorganosiloxane-reinforced resin component (C) which are outside of the range of the present invention. The Comparative Example 7, which contains no polyorganosiloxane-reinforced resin component (C), has an inferior flame retardancy and also shows no improvement in the dripping phenomenon. Products made from the Comparative Example 8, which contains an excessive amount of polyorganosiloxane-reinforced resin component (C), have a poor surface appearance.

The composition of the present invention has attained a remarkably higher flame retardancy by the inclusion of a polyorganosiloxane-reinforced resin in the flame-retardant resin. A significant improvement in the dripping phenomenon has also been achieved. Further, this flame-retardant resin composition exhibits superior impact resistance and moldability, and superior outer appearance of the formed products.

Accordingly, large fabricated products such as office equipment, including OA equipment, and electrical appliances, as well as complicated products, can be formed from the composition of the present invention. This composition is a superior material from the aspect of practical application, with an extremely high value and use industrially.

What is claimed is:

1. A flame-retardant resin composition comprising:
   (A) 100 parts by weight of a bromine-containing copolymer composition containing 1 to 40% by weight of a bromine containing monomer and comprising at least one of A-1 and A-2 wherein A-1 comprises 0 to 100% by weight of a rubber reinforced resin obtained by the polymerization of (a) 5 to 70 parts by weight of rubbery polymer and (b) 95 to 30 parts by weight of a monomer mixture which comprises 0 to 50% by weight of bromostyrene and 50 to 100% by weight of at least one monomer selected from the group consisting of (i) aromatic vinyl monomers other than bromostyrene, (ii) cyanated vinyl monomers, (iii) (meth)acrylates, (iv) maleic anhydride, and (iv) malimide, provided that (a) plus (b) is 100 parts by weight, and A-2 comprises 0 to 100% by weight of a copolymer obtained by the polymerization of 5 to 50 parts by weight of bromostyrene and 95 to 50 parts by weight of at least one monomer selected from the group consisting of aromatic vinyl monomers other than bromostyrene, cyanated vinyl monomers, (meth)acrylates, maleic anhydride, and malimide, said bromine-containing copolymer further comprising 0 to 70% by weight of a copolymer A-3 obtained by copolymerization of 50 to 100 parts by weight of aromatic vinyl monomer other than bromostyrene and 0 to 50 parts by weight of at least one monomer selected from the group consisting of cyanated vinyl monomers, (meth)acrylates, maleic anhydride, and maleimide;
   (B) 0 to 30 parts by weight of a flame-retarding adjuvant; and
   (C) 0.05 to 30 parts by weight of an organopolysiloxane reinforced resin obtained by the polymerization of (c) 5 to 90 parts by weight of an organopolysiloxane polymer and (d) 10 to 95 parts by weight of a vinyl monomer, provided that (c) plus (d) is parts by weight.

2. The flame-retardant resin composition of claim 1 wherein monomer mixture (b) comprises from 6 to 40% by weight of bromostyrene.

3. The flame-retardant resin composition of claim 1 wherein monomer mixture (b) comprises from 6 to 30% by weight of bromostyrene.

4. The flame-retardant resin composition of claim 1 wherein A-1 comprises 12 to 60% by weight of a rubbery polymer.

5. The flame-retardant resin composition of claim 1 wherein A-1 comprises 15 to 50% by weight of a rubbery polymer.

6. The flame-retardant resin composition of claim 1 wherein the rubbery polymer is selected from the group consisting of polybutadiene, butadiene-styrene copolymers, butadiene-bromostyrene copolymers, polyisoprene, butadiene-acrylonitrile copolymers, ethylene-propylene-(dienemethylene) copolymers, isobutylene-isoprene copolymers, acryl rubbers, styrene-butadiene-styrene block copolymers, styrene-butadiene-styrene radial tereblock copolymers, styrene-isoprene-styrene block copolymers, hydrogenated diene (block) copolymers, polyurethane rubbers and silicone rubbers.

7. The flame-retardant resin composition of claim 1 wherein the rubbery polymer is selected from the group consisting of polybutadiene, butadiene-styrene copolymers, and ethylene-propylene-(dienemethylene) copolymers.

8. The flame-retardant resin composition of claim 1 wherein the aromatic vinyl monomers other than bromostyrene are selected from the group consisting of styrene, -methylstyrene, o-methylstyrene, m-methylstyrene, p-methylstyrene, chlorostyrene, dichlorostyrene, -ethylstyrene, methyl- -methylstyrene and dimethylstyrene.

9. The flame-retardant resin composition of claim 9 wherein the aromatic vinyl monomer other than bromostyrene is selected from the group consisting of styrene, -methylstyrene, and p-methylstyrene.

10. The flame-retardant resin composition of claim 1 wherein the cyanated vinyl monomer is selected from the group consisting of acrylonitrile and methacrylonitrile.

11. The flame-retardant resin composition of claim 1 wherein the cyanated vinyl monomer is acrylonitrile.

12. The flame-retardant resin composition of claim 1 wherein the (meth)acrylate is selected from the group consisting of methyl acrylate, ethyl acrylate, butyl acrylate, methyl methacrylate and butyl methacrylate.

13. The flame-retardant resin composition of claim 1 wherein the (meth)acrylate is methyl methacrylate.

14. The flame-retardant resin composition of claim 1 wherein the maleimide monomer is selected from the group consisting of maleimide, N-methylmaleimide, N-ethylmaleimide, N-propylmaleimide, N-isopropylmaleimide, N-cyclohexylmaleimide, N-(p-bromophenyl)maleimide, tribromophenylmaleimide and N-(p-chlorophenyl)maleimide.

15. The flame-retardant resin composition of claim 15 wherein the maleimide monomer is selected from the group consisting of maleimide, N-phenylmaleimide, N-cyclohexylmaleimide and tribromophenylmaleimide.

16. The flame-retardant resin composition of claim 1 wherein the graft ratio of the rubber reinforced resin of A-1 is between 10 to 150%.

17. The flame-retardant resin composition of claim 1 wherein the graft ratio of the rubber reinforced resin of A-1 is between 20 to 120%.

18. The flame retardant resin composition of claim 1 where A-2 comprises from 10 to 40% by weight of bromostyrene.

19. The flame retardant resin composition of claim 1 wherein A-2 comprises from 20 to 38% by weight of bromostyrene.

20. The flame retardant resin composition of claim 1 wherein component (B) is a metallic oxide.

21. The flame retardant resin composition of claim 1 wherein component (B) is antimony trioxide.

22. The flame retardant resin composition of claim 1 wherein the organopolysiloxane reinforced resin is obtained by the polymerization of (c) 10 to 70 parts by weight of an organopolysiloxane polymer and (d) 30 to 90 parts by weight of a vinyl monomer, provided that (c) plus (d) is 100 parts by weight.

23. The flame retardant resin composition of claim 1 wherein the organopolysiloxane reinforced resin is obtained by the polymerization of (c) 20 to 60 parts by weight of an organopolysiloxane polymer and (d) 40 to 80 parts by weight of a vinyl monomer, provided that (c) plus (d) is 100 parts by weight.

* * * * *